(12) United States Patent
Nagasaka

(10) Patent No.: US 12,402,179 B2
(45) Date of Patent: Aug. 26, 2025

(54) INFORMATION PROCESSING DEVICE AND INFORMATION PROCESSING METHOD

(71) Applicant: SONY GROUP CORPORATION, Tokyo (JP)

(72) Inventor: Hideo Nagasaka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 346 days.

(21) Appl. No.: 17/906,570

(22) PCT Filed: Mar. 16, 2021

(86) PCT No.: PCT/JP2021/010583
§ 371 (c)(1),
(2) Date: Sep. 16, 2022

(87) PCT Pub. No.: WO2021/193231
PCT Pub. Date: Sep. 30, 2021

(65) Prior Publication Data
US 2023/0143838 A1 May 11, 2023

(30) Foreign Application Priority Data
Mar. 24, 2020 (JP) .................... 2020-052654

(51) Int. Cl.
*H04W 76/10* (2018.01)
(52) U.S. Cl.
CPC .................... *H04W 76/10* (2018.02)
(58) Field of Classification Search
CPC .................................................. H04W 76/10
See application file for complete search history.

(56) References Cited

U.S. PATENT DOCUMENTS

| | | | |
|---|---|---|---|
| 2011/0050732 A1* | 3/2011 | Arrasvuori | G06Q 50/00 709/204 |
| 2016/0105432 A1 | 4/2016 | Decanne | |
| 2017/0277500 A1* | 9/2017 | Ono | G06Q 30/02 |
| 2018/0350144 A1* | 12/2018 | Rathod | G06Q 20/3224 |
| 2018/0352070 A1 | 12/2018 | Eichfeld | |

FOREIGN PATENT DOCUMENTS

| | | |
|---|---|---|
| JP | 2010-057085 A | 3/2010 |
| JP | 2016-095741 A | 5/2016 |
| JP | 2017-174341 A | 9/2017 |
| JP | 2020-024610 A | 2/2020 |

OTHER PUBLICATIONS

International Search Report and Written Opinion of PCT Application No. PCT/JP2021/010583, issued on Jun. 15, 2021, 10 pages of ISRWO.

* cited by examiner

*Primary Examiner* — David Bilodeau
(74) *Attorney, Agent, or Firm* — CHIP LAW GROUP

(57) ABSTRACT

Provided is an information processing device that includes a calculation unit that calculates a degree of interest to a connection destination of a user having a terminal device. The information processing device further includes a connection switch unit that controls a switch in connection to the connection destination, on the basis of a response of the user to confirmation of connection to the connection destination, the confirmation of connection being presented on the basis of the degree of interest calculated by the calculation unit.

18 Claims, 9 Drawing Sheets

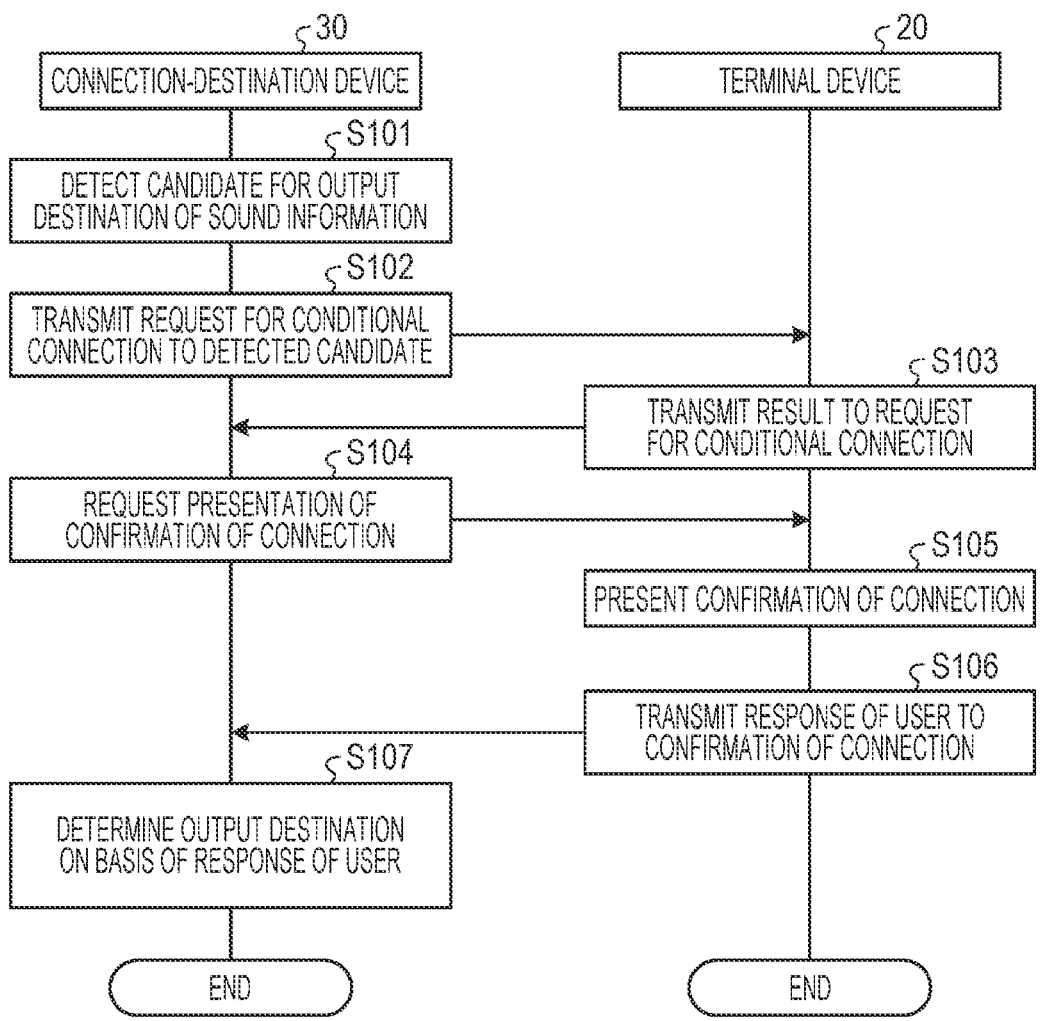

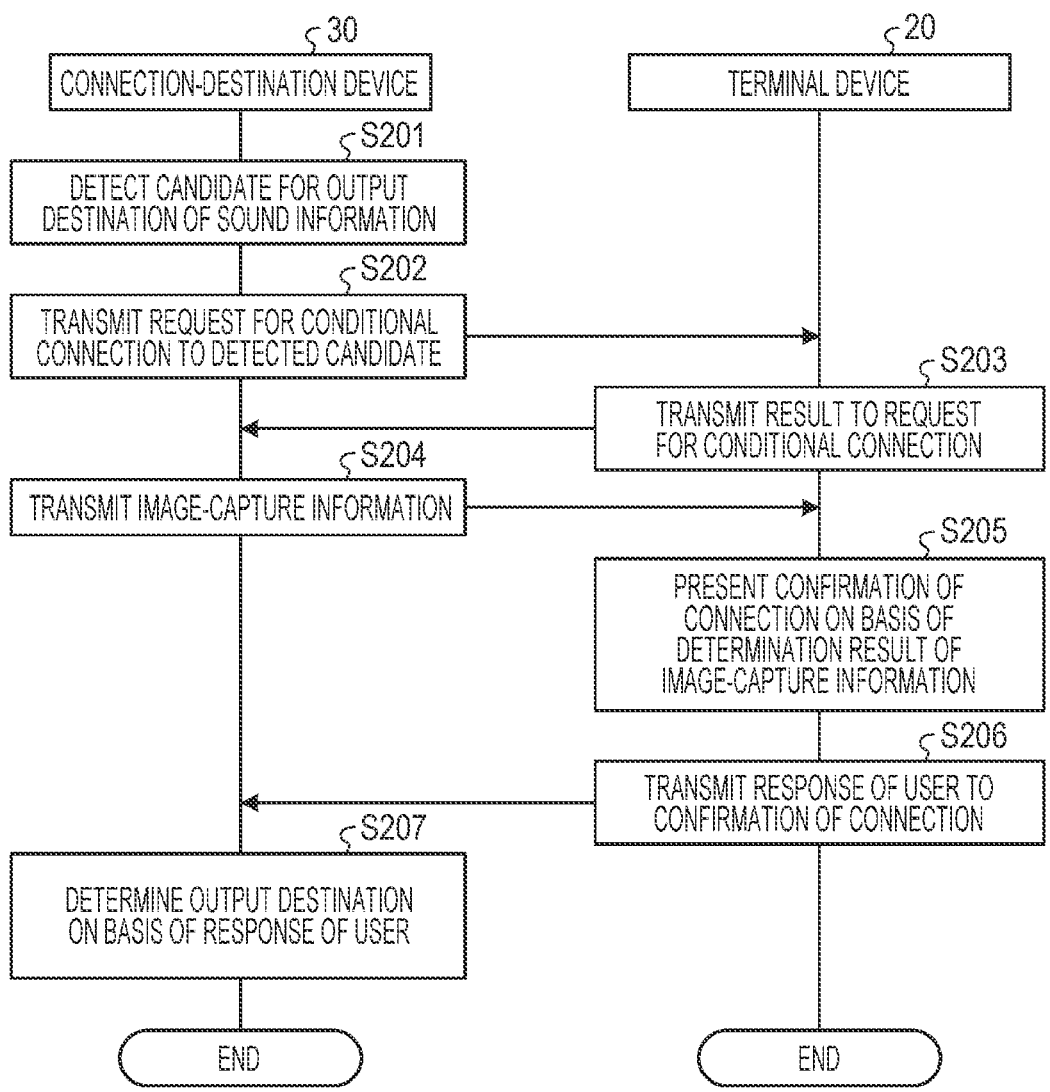

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2021/010583 filed on Mar. 16, 2021, which claims priority benefit of Japanese Patent Application No. JP 2020-052654 filed in the Japan Patent Office on Mar. 24, 2020. Each of the above-referenced applications is hereby incorporated herein by reference in its entirety.

TECHNICAL FIELD

The present disclosure relates to an information processing device, an information processing method, and an information processing program.

BACKGROUND ART

In recent years, for wearable equipment, such as headphones, capable of outputting sound information (e.g., audio data or acoustic data), widespread has been not only technology aiming to cut off external sound information, such as ambient sound information, but also technology aiming to actively take in external sound information. For example, widespread has been technology aiming to take in sound information about image information (moving image information) in which a user is interested, displayed on external display equipment. Thus, even in a case where a plurality of users is located in the same space, each of the plurality of users can listen to sound information about different image information.

CITATION LIST

Patent Document

Patent Document 1: Japanese Patent Application Laid-Open No. 2010-57085

SUMMARY OF THE INVENTION

Problems to be Solved by the Invention

However, the conventional technology does not necessarily enable acceleration of further improvement in usability. In public transport or the like, generalized has been display of image information, such as advertisements, on signage. However, from the viewpoint of public space, it is often difficult to output sound information. According to the conventional technique, for example, during use of public transport or the like, a user is not enabled to listen to sound information about image information, such as advertisements, in which the user gets interested. Furthermore, the conventional technology does not necessarily enable service providers that provide image information, such as advertisements, to accelerate improvement in service.

As above, according to the conventional technology, it is difficult to accelerate further improvement in usability.

Thus, the present disclosure proposes an information processing device, an information processing method, and an information processing program, which are novel and improved, enabling acceleration of further improvement in usability.

Solutions to Problems

According to the present disclosure, provided is an information processing device including: a calculation unit configured to calculate a degree of interest to a connection destination of a user having a terminal device; and a connection switch unit configured to control a switch in connection to the connection destination, on the basis of a response of the user to confirmation of connection to the connection destination, the confirmation of connection being presented on the basis of the degree of interest calculated by the calculation unit.

BRIEF DESCRIPTION OF DRAWINGS

FIG. 8 illustrates an exemplary user information storage unit according to the embodiment.

FIG. 9 is a flowchart illustrating a flow of processing in an information processing device according to the embodiment.

FIG. 10 is a flowchart illustrating a flow of processing in the information processing device according to the embodiment.

FIG. 11 illustrates an exemplary user information storage unit according to the embodiment.

MODE FOR CARRYING OUT THE INVENTION

A preferred embodiment of the present disclosure will be described in detail below with reference to the accompanying drawings. Note that, in the present specification and the drawings, constituent elements having substantially the same functional configurations are denoted with the same reference signs, and thus the duplicate descriptions thereof will be omitted.

Note that the descriptions will be given in the following order:
1. Embodiment of Present Disclosure
1.1. Introduction
1.2. Configuration of Information Processing System
2. Function of Information Processing System
2.1. Function Overview 2.2. Exemplary Functional Configuration
2.3. Processing of Information Processing System
2.4. Various Types of Processing
3. Exemplary Hardware Configuration
4. Summary <<1. Embodiment of Present Disclosure>>
<1.1. Introduction>

Conditional connection according to an embodiment below means that, with a first device and a second device in connection, the second device is not allowed to output content (e.g., sound information) that the first device receives.

Conditional connection and connection according to the embodiment below are established with Bluetooth (registered trademark), but this example is not limiting. For example, conditional connection and connection according to the embodiment may be established with Wifi or a different wired or wireless connection technique.

<1.2. Configuration of Information Processing System>

Figure 1:
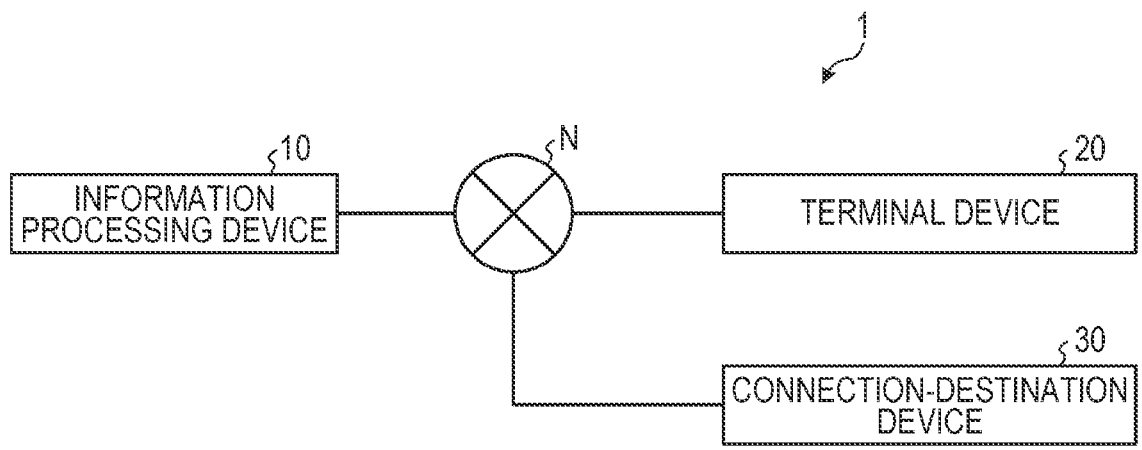
FIG. 1 illustrates an exemplary configuration of an information processing system according to an embodiment.

First, the configuration of an information processing system 1 according to the embodiment will be described. FIG. 1 illustrates an exemplary configuration of the information processing system 1. As illustrated in FIG. 1, the information processing system 1 includes an information processing device 10, a terminal device 20, and a connection-destination device 30. Various devices can be connected to the information processing device 10. For example, the terminal device 20 and the connection-destination device 30 are connected to the information processing device 10, allowing information linkage between each device. The terminal device 20 and the connection-destination device 30 are wirelessly connected to the information processing device 10. For example, the information processing device 10 performs near field communication, pursuant to Bluetooth (registered trademark), with the terminal device 20 and the connection-destination device 30. Note that the terminal device 20 and the connection-destination device 30 may be connected to the information processing device 10 by wire or through a network.

(1) Information Processing Device 10

The information processing device 10 serves as an information processing device that controls, in accordance with the degree of interest of a user to the connection-destination device 30, for example, a switch in connection of the terminal device 20 to the connection-destination device 30. Specifically, the information processing device 10 first calculates the degree of interest of a user to the connection-destination device 30. Then, on the basis of a response of the user (e.g., an operation) to confirmation of connection to the connection destination presented on the basis of the calculated degree of interest, the information processing device 10 controls a switch in connection to the connection destination.

Furthermore, the information processing device 10 has a function of controlling the entire operation of the information processing system 1. For example, on the basis of information linked between each device, the information processing device 10 controls the entire operation of the information processing system 1. Specifically, on the basis of information received from the terminal device 20, the information processing device 10 controls connection of the terminal device 20.

The information processing device 10 is achieved by a personal computer (PC), a work station (WS), or the like. Note that the information processing device 10 is not limited to a PC, a WS, or the like. For example, the information processing device 10 may be an information processing device such as a PC or a WS having an application functioning as the information processing device 10 implemented thereon, may be built in a terminal device, such as a smartphone, or may be a service on cloud computing connected through a network (e.g., 5G).

(2) Terminal Device 20

The terminal device 20 serves as wearable equipment, such as a pair of headphones, capable of outputting sound information. Examples of the terminal device 20 include a smartphone, a pair of headphones of a release type of which the housing portions are not airtight, and the like.

On the basis of information transmitted from the connection-destination device 30, for example, the terminal device 20 outputs sound information for confirmation of connection. Then, the terminal device 20 receives a response of the user to the confirmation of connection.

(3) Connection-Destination Device 30

The connection-destination device 30 serves as an information processing device to which the information processing device 10 or the terminal device 20 can be connected. For example, the connection-destination device 30 is achieved by a display device capable of displaying image information, such as signage, a television (TV), a PC, a smartphone, or the like.

For example, the connection-destination device 30 captures a user in a predetermined range with respect to the connection-destination device 30. Then, the connection-destination device 30 transmits captured image-capture information, for example, to the terminal device 20.

<<2. Function of Information Processing System>>

The configuration of the information processing system 1 has been described above. Next, the function of the information processing system 1 will be described.

<2.1. Function Overview>

Figure 2:
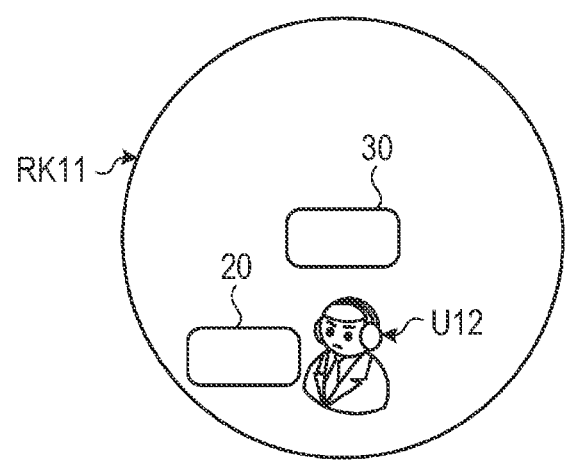
FIG. 2 illustrates an exemplary overview of the function of the information processing system according to the embodiment.

FIG. 2 illustrates an overview of the function of the information processing system 1 according to the embodiment. The information processing system 1 first detects the terminal device 20 inside a range RK11 with respect to the connection-destination device 30. This case corresponds to, for example, a case where a user U12 who uses the terminal device 20 has moved inside the range RK11 with respect to the connection-destination device 30. For example, for powering up the connection-destination device 30, the user U12 has moved inside the range RK11. Here, for example, the range RK11 may result from a case where the time required for a radio wave for measurement transmitted from the terminal device 20 to return to the terminal device 20 via the connection-destination device 30 is a predetermined threshold or less, or may be determined with any method enabling determination of a predetermined range. Furthermore, for example, between in viewing and listening to signage in a train and in viewing a monitor on the street, the distance between the user U12 and the device or the size of the device varies. Thus, the range RK11 may be appropriately changed, for example, in accordance with the environment around the user U12 or the size of the connection-destination device 30. Note that, similarly, a range RK21 and a range RK22 (FIG. 3), a range RK31 (FIG. 4), a range RK41 (FIG. 5), and a range RK51 (FIG. 6), to be described later, may be determined with any method enabling determination of a predetermined range, and may be appropriately changed. Next, the information processing system 1 calculates the degree of interest of the user U12 to the connection-destination device 30. For example, on the basis of positional information between the terminal device 20 and the connection-destination device 30, the information processing system 1 calculates the degree of interest of the user U12 to the connection-destination device 30 higher as the distance decreases between the terminal device 20 and the connection-destination device 30. Furthermore, for example, on the basis of angle information between a predetermined direction of the terminal device 20 and a predetermined direction of the connection-destination device 30, the information processing system 1 calculates the degree of interest of the user U12 to the connection-destination device 30 higher as the angle decreases between the predetermined direction of the terminal device 20 and the predetermined direction of the connection-destination device 30. Then, in a case where the calculated degree of interest fulfills a predetermined condition, the information processing system 1 performs presentation of confirmation of connection to the user U12 through the terminal device 20. For example, the information processing system 1 performs presentation with sound information. As a specific example, the information processing system 1 outputs a confirmation sound regarding confirmation of connection, such as "Should connection be established to the signage terminal?". Furthermore, for example, the information processing system 1 may perform presentation of confirmation with identification information for identifying the connection-destination device 30. As a specific example, the information processing system 1 may output a confirmation sound regarding confirmation of connection with identification information about the connection-destination device 30, such as "Should connection be established to the 2247 television?". At this time, the information processing system 1 may display, on the display screen of the connection-destination device 30, the identification information about the connection-destination device 30, such as "2247". Thus, for example, the information processing system 1 presents a number on the display screen of the connection-destination device 30 with a confirmation sound including the same number, so that the user can be properly informed which device is the connection destination. Furthermore, the information processing system 1 can acquire, from the user U12, confirmation regarding a switch in connection. Furthermore, the information processing system 1 can prompt the user U12 to respond to the presented confirmation. Then, on the basis of a result of response from the user U12, the information processing system 1 switches the connection destination of the terminal device 20 to the connection-destination device 30. Thus, the terminal device 20 can output content that the connection-destination device 30 receives. Furthermore, the information processing system 1 enables output of other content until immediately before a switch in connection, so that a switch in connection can be made with no break in sound. Furthermore, for example, in switching in connection from the signage terminal in connection to another terminal, the volume in sound is gradually turned down until the distance between the user U12 and the signage terminal reaches or falls below a predetermined value, and then the volume in sound is gradually turned up after connection to the another terminal, instead of reproduction at the volume in sound of the content being reproduced. Thus, a switch in connection can be made with prevention of an uncomfortable break in sound and sudden reproduction to the user. Moreover, for example, the timing of connection to the signage terminal is likely to correspond to somewhere after the beginning of content, such as advertisements or music, being reproduced. In that case, such processing as described above enables a comfortable switch in connection with prevention of sudden reproduction.

(Conditional Connection Based on Positional Information)

Figure 3:
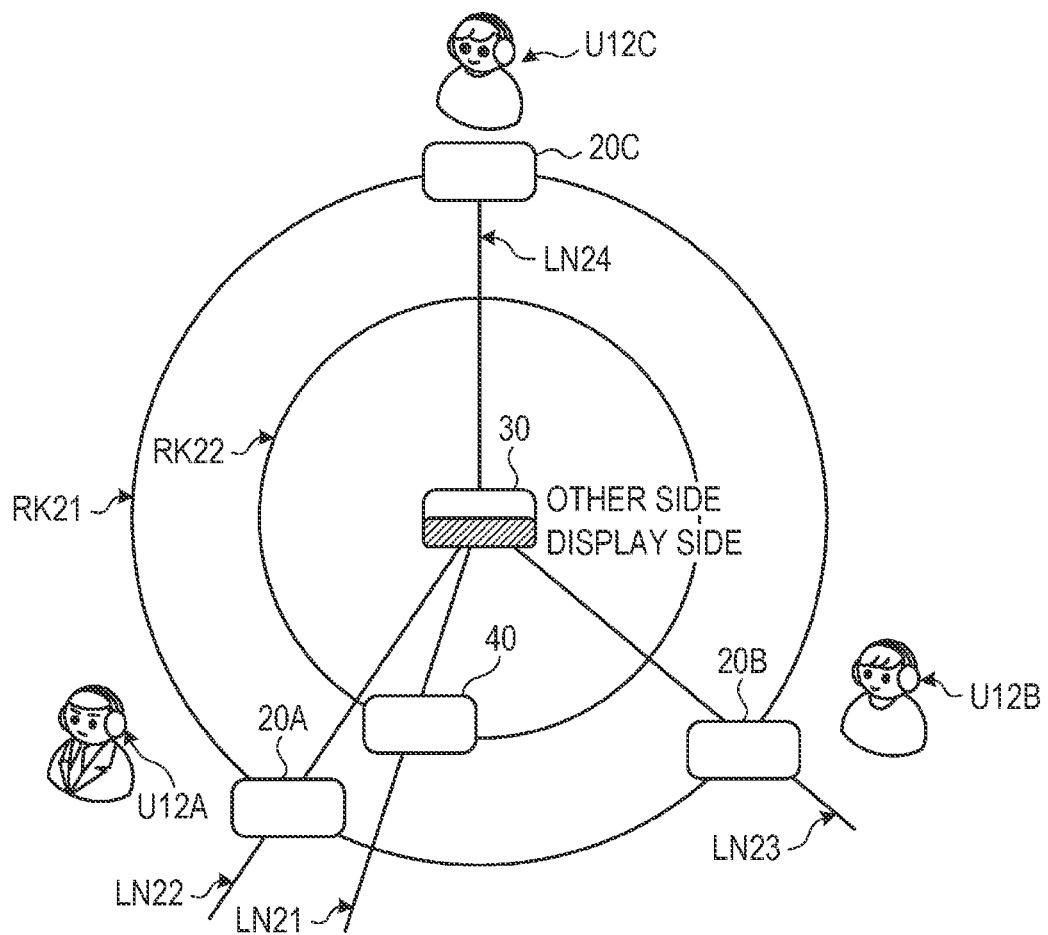
FIG. 3 illustrates an exemplary overview of the function of the information processing system according to the embodiment.

With FIG. 3, described will be an overview of conditional connection with positional information. Similar descriptions to those with FIG. 2 will be appropriately omitted below. Referring to FIG. 3, on the basis of positional information between terminal devices 20, a connection-destination device 30, and a connection-destination control device 40 that controls the connection-destination device 30, a switch in connection is made. Note that, for example, the connection-destination control device 40 serves as a remote controller that controls the connection-destination device 30. The information processing system 1 first detects the terminal devices 20 (terminal devices 20A to 20C) inside a range RK21 with respect to the connection-destination device 30. Furthermore, the information processing system 1 detects the connection-destination control device 40. A range RK22 indicates the distance between the connection-destination device 30 and the connection-destination control device 40. A direction LN21 indicates the direction from the connection-destination device 30 to the connection-destination control device 40. A direction LN22 indicates the direction from the connection-destination device 30 to the terminal device 20A. A direction LN23 indicates the direction from the connection-destination device 30 to the terminal device 20B. A direction LN24 indicates the direction from the connection-destination device 30 to the terminal device 20C. Here, referring to FIG. 3, for example, users U12A and U12B are located on the display side of the connection-destination device 30 (e.g., a television). If a user U12C is located, from the connection-destination device 30, at a distance equal to the distance between the connection-destination device 30 and each of the users U12A and U12B, but on the other side to the display side of the connection-destination device 30, it is determined that the user U12C is located accidentally at the equal distance from the connection-destination device 30 in range, so that unnecessary connection can be prevented. Next, on the basis of the positional relationship between the connection-destination device 30, the connection-destination control device 40, and the terminal devices 20, the information processing system 1 calculates the degrees of interest of the users U12 (users U12A to U12C). Specifically, on the basis of angle information between a predetermined direction from the connection-destination device 30 to the connection-destination control device 40 and a predetermined direction from the connection-destination device 30 to each terminal device 20, the information processing system 1 calculates the degree of interest of the corresponding user U12 to the connection-destination device 30. The information processing system 1 calculates the degree of interest of each user U12 to the connection-destination device 30 higher in response to smaller angle information to the direction LN21. Furthermore, on the basis of distance information based on positional information between the connection-destination device 30, the connection-destination control device 40, and the terminal devices 20, together with the angle information, the information processing system 1 may calculate the degree of interest of each user U12 to the connection-destination device 30. Thus, the information processing system 1 enables proper specification of a user who has an interest in connection to the connection-destination device 30. Referring to FIG. 3, the information processing system 1 specifies, as a user who has an interest in connection to the connection-destination device 30, the user U12A of the terminal device 20A of which the angle information to the direction LN21 is smallest. The information processing system 1 specifies the specified user U12A, for example, as a user who has started up the connection-destination device 30 with the connection-destination control device 40. Thus, the information processing system 1 enables connection matching between the terminal device 20 and the connection-destination device 30 without any graphical user interface (GUI) and without troubling the user.

The information processing system 1 may perform, without presentation of confirmation of connection to the connection-destination device 30, processing of connection to the user specified as having an interest in connection to the connection-destination device 30. In this case, the information processing system 1 may perform processing of connection without processing of conditional connection. Referring to FIG. 3, for example, at the timing the user U12A starts up the connection-destination device 30, the information processing system 1 may specify the non-specified user U12B as a user accidentally located inside the range RK21. Then, on the assumption that the user U12B is highly likely to move outside from the range RK21, the information processing system 1 may perform presentation of confirmation of connection to the connection-destination device 30. In this case, the information processing system 1 may perform processing of conditional connection before processing of connection. The information processing system 1 enables confirmation of connection with no direct connection due to conditional connection. Furthermore, the information processing system 1 may specify, as a user being accidentally located, the user U12C located, from the connection-destination device 30, at a distance equal to the distance between the connection-destination device 30 and each of the users U12A and U12B, but on the other side to the display. Note that the information processing system 1 does not necessarily perform processing of conditional connection to the user specified as being accidentally located. Thus, the information processing system 1 enables prevention of unnecessary processing, so that a reduction can be made in processing load.

(Processing 1 in Case where Plurality of Connection-Destination Candidates is Present)

Figure 4:
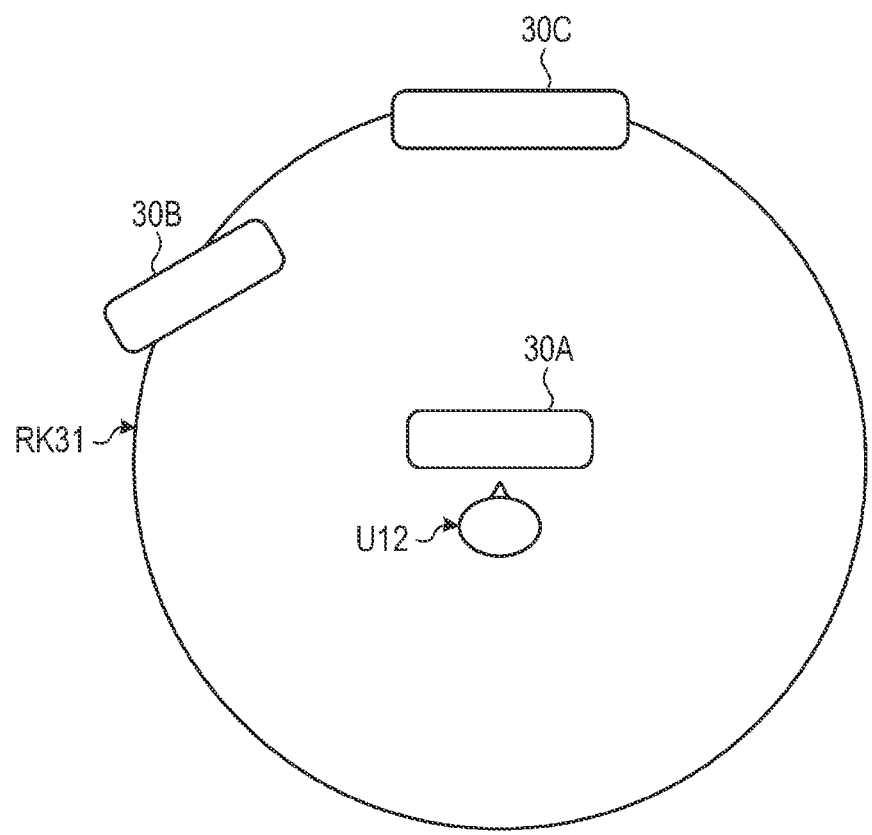
FIG. 4 illustrates an exemplary overview of the function of the information processing system according to the embodiment.

With FIG. 4, described will be an overview of processing in a case where a plurality of connection-destination candidates is present. Similar descriptions to those with FIGS. 2 and 3 will be appropriately omitted below. Referring to FIG. 4, a plurality of connection-destination devices 30 (connection-destination devices 30A to 30C) is located inside a range RK31 with respect to the user U12. The plurality of connection-destination devices 30 corresponds to connection-destination candidates for the terminal device 20. The range RK31 indicates the distance between the terminal device 20 and each of the connection-destination devices 30B and 30C. Note that FIG. 4 illustrates that the user U12 is closed to the connection-destination device 30A. Because the connection-destination device 30A is closest to the user U12, the information processing system 1 specifies the connection-destination device 30A as the connection-destination device 30 to which the degree of interest of the user U12 is highest. Furthermore, the information processing system 1 calculates the degree of interest of the user U12 to the connection-destination device 30A. Then, on the basis of the degree of interest of the user U12 to the connection-destination device 30A, the information processing system 1 establishes conditional connection between the terminal device 20 and the connection-destination device 30A.

(Conditional Connection with Face Authentication Processing)

Figure 5:
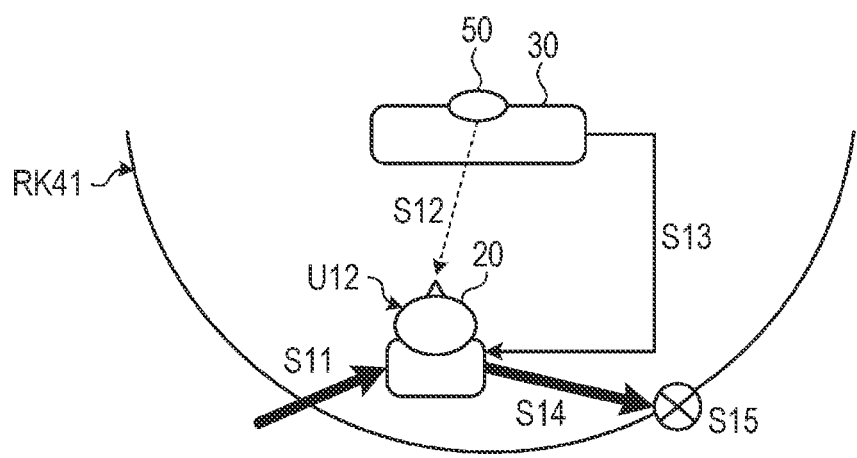
FIG. 5 illustrates an exemplary overview of the function of the information processing system according to the embodiment.

With FIG. 5, described will be an overview of conditional connection with face authentication processing. Similar descriptions to those with FIGS. 2 to 4 will be appropriately omitted below. The information processing system 1 first detects the user U12 having moved inside a range RK41 with respect to the connection-destination device 30 (S11). Next, the information processing system 1 acquires image-capture information about the user U12 captured by an image capturing device 50 (S12). Note that the image capturing device 50 is, for example, a camera with which the connection-destination device 30 is equipped. Then, on the basis of the acquired image-capture information, the information processing system 1 specifies the direction of line-of-sight of the user U12 to the connection-destination device 30. For example, the information processing system 1 specifies the direction of line-of-sight of the user U12 through line-of-sight detection technology with image analysis processing. Note that, with image analysis processing, the information processing system 1 may determine whether or not the face of the user U12 is oriented to the front of the connection-destination device 30. Then, on the basis of the specified direction of line-of-sight of the user U12, the information processing system 1 calculates the degree of interest of the user U12 to the connection-destination device 30. For example, the information processing system 1 calculates the degree of interest of the user U12 to the connection-destination device 30 higher as the connection-destination device 30 is closer to the direction of line-of-sight of the user U12. Then, in a case where the calculated degree of interest fulfills a predetermined condition, the information processing system 1 transmits the image-capture information to the terminal device 20. Then, the information processing system 1 compares the transmitted image-capture information with user information stored in the terminal device 20, to perform face authentication processing of the user U12 (S13). Then, on the basis of a result of the face authentication processing, the information processing system 1 establishes conditional connection between the terminal device 20 and the connection-destination device 30. Furthermore, when detecting movement of the user U12 to the outside of the range RK41 (S14), the information processing system 1 cancels the conditional connection of the terminal device 20 to the connection-destination device 30 (S15).

In the above example, the degree of interest of the user U12 is calculated on the basis of the direction of line-of-sight of the user U12. There can be a case where the user U12 has worn, for example, an eyewear-type device based on virtual reality (VR) or augmented reality (AR). In a case where the eyewear-type device is transmissive, the direction of line-of-sight can be detected as described above. However, in a case where the eyewear-type device is non-transmissive, the direction of line-of-sight cannot be detected. In that case, mainly, the degree of interest is calculated on the basis of distance information between the user U12 and the connection-destination device 30. Furthermore, in accordance with user's situation or the ambient environment, parameters, such as line-of-sight information and distance information, may be appropriately used independently or in combination.

(Processing 2 in Case where Plurality of Connection-Destination Candidates is Present)

Figure 6:
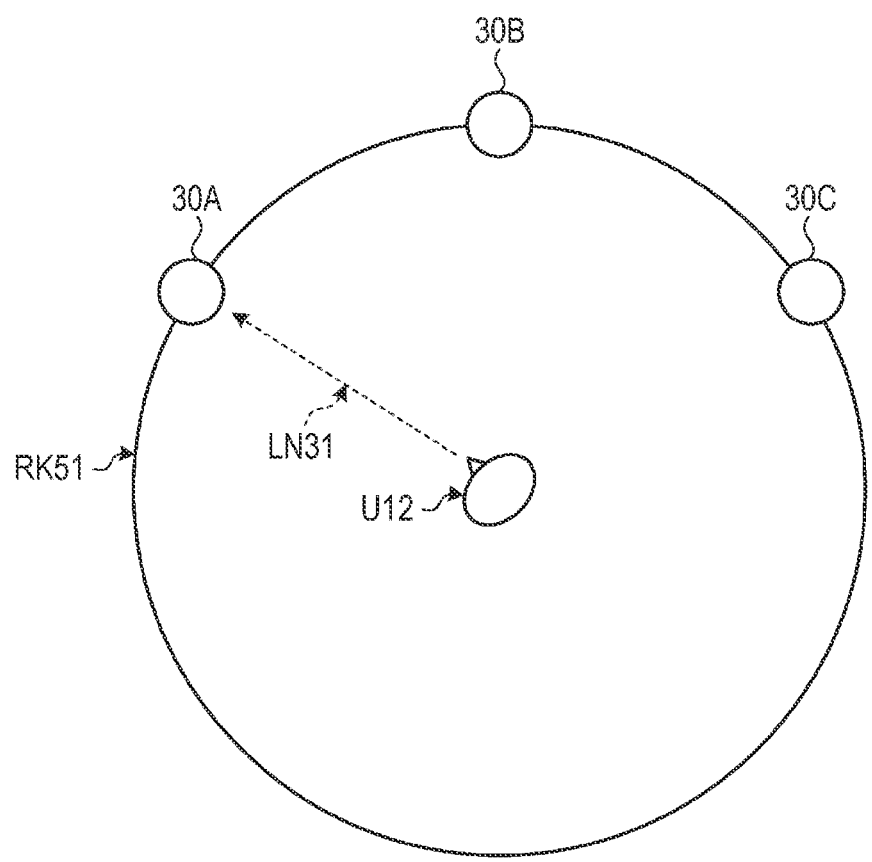
FIG. 6 illustrates an exemplary overview of the function of the information processing system according to the embodiment.

With FIG. 6, described will be an overview of processing in a case where a plurality of connection-destination candidates is present. Similar descriptions to those with FIGS. 2 to 5 will be appropriately omitted below. Referring to FIG. 6, a plurality of connection-destination devices 30 (connection-destination devices 30A to 30C) is located inside a range RK51 with respect to the user U12. The plurality of connection-destination devices 30 corresponds to connection-destination candidates for the terminal device 20. A direction LN31 indicates the direction of line-of-sight of the user U12. In this case, the user U12 has a line-of-sight to the connection-destination device 30A in the direction LN31. The information processing system 1 calculates the degree of interest of the user U12 to the connection-destination device 30A highest because of the connection-destination device 30A in the direction of line-of-sight of the user U12. Then, on the basis of the degree of interest of the user U12 to the connection-destination device 30A, the information processing system 1 establishes conditional connection between the terminal device 20 and the connection-destination device 30. As a connection method, from among the connection-destination devices 30A to 30C of which the respective pieces of content can be listened to by the user U12 having worn a headset, for example, under out-of-head localization or the like, for example, in response to a selection gesture, such as a nod, made by the user U12 to the connection-destination device 30A in the direction of line-of-sight of the user U12, connection may be established to the connection-destination device 30A.

<2.2. Exemplary Functional Configuration>

Figure 7:
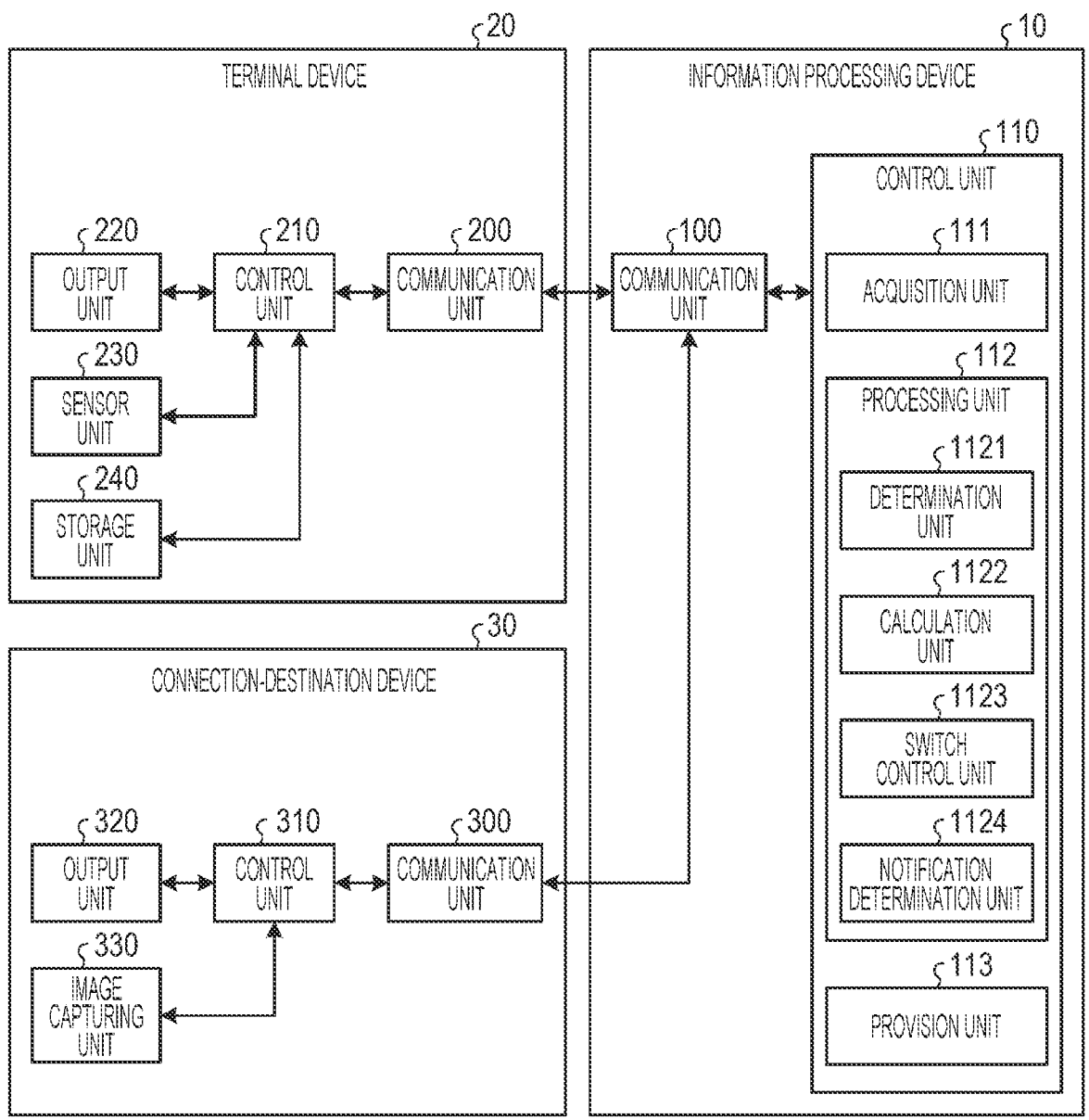
FIG. 7 is a block diagram of an exemplary configuration of the information processing system according to the embodiment.

FIG. 7 is a block diagram of an exemplary functional configuration of the information processing system 1 according to the embodiment.

(1) Information Processing Device 10

As illustrated in FIG. 7, the information processing device 10 includes a communication unit 100 and a control unit 110. Note that the information processing device 10 includes at least the control unit 110.

(1-1) Communication Unit 100

The communication unit 100 has a function of communicating with an external device. For example, in communication with an external device, the communication unit 100 outputs, to the control unit 110, information received from the external device. Specifically, the communication unit 100 outputs, to the control unit 110, information received from the terminal device 20 or the connection-destination device 30. For example, the communication unit 100 outputs, to the control unit 110, information for calculation of the degree of interest of the user to the connection-destination device 30.

In communication with an external device, the communication unit 100 transmits, to the external device, information input from the control unit 110. Specifically, the communication unit 100 transmits, to the terminal device 20 or the connection-destination device 30, information regarding acquisition of information input from the control unit 110.

(1-2) Control Unit 110

The control unit 110 has a function of controlling the operation of the information processing device 10. For example, the control unit 110 calculates the degree of interest of the user to the connection-destination device 30. Furthermore, on the basis of the calculated degree of interest, the control unit 110 performs processing of control of the operations of the terminal device 20 and the connection-destination device 30.

In order to achieve the above function, as illustrated in FIG. 7, the control unit 110 includes an acquisition unit 111, a processing unit 112, and a provision unit 113.

Acquisition Unit 111

The acquisition unit 111 has a function of acquiring information for calculation of the degree of interest of the user to the connection-destination device 30. For example, the acquisition unit 111 acquires sensor information indicating information regarding the position or movement of the terminal device 20. Specifically, the acquisition unit 111 acquires sensor information, such as acceleration information, gyro information, global positioning system (GPS) information, geomagnetic information, or radio-wave information. Furthermore, for example, the acquisition unit 111 may acquire sensor information indicating information regarding the relative position or relative movement of the terminal device 20 to the connection-destination device 30. For example, the acquisition unit 111 may acquire sensor information regarding the travel time of a radio wave between the connection-destination device 30 and the terminal device 20.

The acquisition unit 111 acquires information for determination of image-capture information. For example, the acquisition unit 111 acquires image-capture information captured by the connection-destination device 30. Furthermore, for example, the acquisition unit 111 acquires user information stored in the terminal device 20.

Processing Unit 112

The processing unit 112 has a function of controlling processing of the information processing device 10. As illustrated in FIG. 7, the processing unit 112 includes a determination unit 1121, a calculation unit 1122, a switch control unit 1123, and a notification determination unit 1124.

Determination Unit 1121

On the basis of the information acquired by the acquisition unit 111, the determination unit 1121 performs control regarding determination of image-capture information. On the basis of a determination result, for example, the determination unit 1121 determines whether or not a switch in connection of the terminal device 20 to the connection-destination device 30 is to be controlled. For example, the determination unit 1121 determines whether or not the image-capture information transmitted from the connection-destination device 30 includes the user information transmitted from the terminal device 20. Then, in a case where the image-capture information transmitted from the connection-destination device 30 includes the user information transmitted from the terminal device 20, the determination unit 1121 controls conditional connection between the terminal device 20 and the connection-destination device 30.

Calculation Unit 1122

On the basis of the information acquired by the acquisition unit 111, the calculation unit 1122 calculates the degree of interest of the user to the connection-destination device 30. For example, on the basis of positional information between the connection-destination device 30 and the terminal device 20, the calculation unit 1122 calculates the degree of interest of the user to the connection-destination device 30 such that the degree of interest of the user to the connection-destination device 30 is higher as the user is closer to the connection-destination device 30. For example, on the basis of positional information calculated on the basis of the arrival time of a radio wave in the space between the terminal device 20 and the connection-destination device 30, the calculation unit 1122 calculates the degree of interest of the user to the connection-destination device 30.

For example, on the basis of angle information between the direction of line-of-sight of the user and the direction in which the front of the connection-destination device 30 faces, the calculation unit 1122 calculates the degree of interest of the user to the connection-destination device 30 such that the degree of interest of the user to the connection-destination device 30 is higher as the angle information is smaller. For example, on the basis of angle information calculated on the basis of the image-capture information captured by the connection-destination device 30, the calculation unit 1122 calculates the degree of interest of the user to the connection-destination device 30.

In a case where a plurality of connection-destination devices 30 is located in a predetermined range with respect to the terminal device 20, the calculation unit 1122 calculates the degree of interest of the user to each of the plurality of connection-destination devices 30.

Switch Control Unit 1123

The switch control unit 1123 controls a switch in connection to the connection-destination device 30 on the basis of a response of the user to confirmation of connection to the connection-destination device 30 on the basis of the degree of interest calculated by the calculation unit 1122. For example, the switch control unit 1123 makes a switch in connection from the connection-destination device 30 that distributes first content to the connection-destination device 30 that distributes second content different from the first content.

In a case where a plurality of connection-destination devices 30 is located in a predetermined range with respect to the terminal device 20, for example, the switch control unit 1123 controls a switch in connection to the connection-destination device 30 to which the degree of interest is highest.

The switch control unit 1123 controls a switch in connection of the terminal device 20 of the user of which the degree of interest fulfills a predetermined condition, to the connection-destination device 30. For example, in a case where the degrees of interest to the connection-destination device 30 of all users in a predetermined space fulfill a predetermined condition, the switch control unit 1123 controls a switch in connection to an external information processing device different from the connection-destination device 30. For example, the switch control unit 1123 controls a switch in connection to output equipment capable of outputting sound information as an external information processing device different from the connection-destination device 30. Specifically, the switch control unit 1123 controls a switch in connection to a speaker.

On the basis of a gesture of the user to confirmation of connection to the connection-destination device 30, the switch control unit 1123 controls a switch in connection to the connection-destination device 30. For example, in a case where it is determined that a gesture indicating a request for connection is made to confirmation of connection to the connection-destination device 30, the switch control unit 1123 controls a switch in connection to the connection-destination device 30. Note that the gesture indicating a request for connection is, for example, a nod (e.g., nodding the head). Furthermore, the switch control unit 1123 determines the gesture indicating a request for connection, for example, on the basis of the image-capture information captured by the connection-destination device 30, the sensor information detected by the terminal device 20, or the like.

Notification Determination Unit 1124

The notification determination unit 1124 has a function of determining a notification destination to be notified of confirmation of connection, on the basis of comparison between the image-capture information acquired by the acquisition unit 111 and the previously stored user information. Note that the notification destination is, for example, the terminal device 20. Furthermore, the notification destination is not limited to the terminal device 20 and may be any information processing device capable of notifying the user of confirmation of connection. For example, the notification determination unit 1124 compares the image-capture information about the user included in the image-capture information acquired by the acquisition unit 111 with the respective pieces of user information stored in terminal devices 20 in a predetermined range with respect to the connection-destination device 30, to determine the notification destination to be notified of confirmation of connection. At this time, for example, the notification determination unit 1124 performs image analysis processing to the image-capture information acquired by the acquisition unit 111, to acquire the image-capture information about the user included in the image-capture information. Furthermore, for example, the notification determination unit 1124 compares the image-capture information about the user of which the degree of interest to the connection-destination device 30 fulfills a predetermined condition with the respective pieces of user information stored in terminal devices 20 in a predetermined range with respect to the connection-destination device 30, to determine the notification destination to be notified of confirmation of connection.

Provision Unit 113

The provision unit 113 has a function of providing control information for a switch in connection to the connection-destination device 30. The provision unit 113 provides the control information for a switch in connection to the connection-destination device 30, for example, to the terminal device 20. For example, the provision unit 113 provides the terminal device 20 with control information based on a determination result from the determination unit 1121. Furthermore, for example, the provision unit 113 provides control information for requesting the notification destination determined by the notification determination unit 1124 to perform presentation of confirmation of connection. Furthermore, for example, the provision unit 113 provides the connection-destination device 30 with control information for detecting the output destination of content that the connection-destination device 30 receives.

(2) Terminal Device 20

As illustrated in FIG. 7, the terminal device 20 includes a communication unit 200, a control unit 210, an output unit 220, a sensor unit 230, and a storage unit 240.

(2-1) Communication Unit 200

The communication unit 200 has a function of communicating with an external device. For example, in communication with an external device, the communication unit 200 outputs, to the control unit 210, information received from the external device. Specifically, the communication unit 200 outputs, to the control unit 210, the image-capture information received from the connection-destination device 30. Furthermore, the communication unit 200 outputs, to the control unit 210, the control information received from the information processing device 10.

(2-2) Control Unit 210

The control unit 210 has a function of controlling the entire operation of the terminal device 20.

For example, the control unit 210 performs processing of receiving a response of the user to information for confirmation of connection. The control unit 210 transmits, for example, to the information processing device 10, information regarding the received response of the user.

(2-3) Output Unit 220

The output unit 220 has a function of outputting information for confirmation of connection. For example, the control unit 210 outputs sound information for confirmation of connection.

(2-4) Sensor Unit 230

The sensor unit 230 has a function of acquiring sensor information measured by each measurement instrument. For example, the sensor unit 230 acquires sensor information, such as acceleration information, gyro information, GPS information, or geomagnetic information. The sensor unit 230 illustrated in FIG. 7 may include an acceleration sensor unit 231, a gyro sensor unit 232, a GPS reception unit 233, and a geomagnetic sensor unit 234.

(2-5) Storage Unit 240

For example, the storage unit 240 is achieved by a semiconductor memory element, such as a RAM or a flash memory, or a storage device, such as a hard disk or an optical disc. The storage unit 240 has a function of storing data regarding processing in the terminal device 20.

FIG. 8 illustrates an exemplary storage unit 240. The storage unit 240 illustrated in FIG. 8 stores user information. As illustrated in FIG. 8, the storage unit 240 may have items, such as "user ID" and "user information".

The "user ID" indicates identification information for identifying a user. The "user information" indicates image-capture information about a user. For example, the image-capture information captured by the terminal device 20 is stored in the "user information". In the example illustrated in FIG. 8, conceptual information, such as "user information #11" and "user information #12", has been stored in the "user information". In practice, for example, an illustrative image of a user (e.g., a face photo) or data of feature points of the face of a user is stored.

(3) Connection-Destination Device 30

As illustrated in FIG. 7, the connection-destination device 30 includes a communication unit 300, a control unit 310, an output unit 320, and an image capturing unit 330.

(3-1) Communication Unit 300

The communication unit 300 has a function of communicating with an external device. For example, in communication with an external device, the communication unit 300 outputs, to the control unit 310, information received from the external device. Specifically, the communication unit 300 outputs, to the control unit 310, the control information received from the information processing device 10. Furthermore, the communication unit 300 outputs, to the control unit 310, information regarding a determination result of the image-capture information received from the terminal device 20.

(3-2) Control Unit 310

The control unit 310 has a function of controlling the operation of the connection-destination device 30.

For example, the control unit 310 performs processing regarding acquisition of the image-capture information about the user. For example, the control unit 310 detects the user having come close into a predetermined range with respect to the connection-destination device 30. For example, the control unit 310 acquires the image-capture information captured by the image capturing unit 330. The control unit 310 transmits the image-capture information, for example, to the information processing device 10 through the communication unit 300.

(3-3) Output Unit 320

The output unit 320 has a function of outputting content that the connection-destination device 30 receives.

(3-4) Image Capturing Unit 330

The image capturing unit 330 has a function of performing image capturing. For example, on the basis of detection of the user, the image capturing unit 330 performs image capturing.

<2.3. Processing of Information Processing System>

The function of the information processing system 1 according to the embodiment has been described above. Next, processing of the information processing system 1 will be described.

(1) Processing 1 in Terminal Device 20 and Connection-Destination Device 30

FIG. 9 is a flowchart illustrating a flow of processing in the terminal device 20 and the connection-destination device 30 according to the embodiment. Specifically, illustrated is a flow of processing in which the terminal device 20 and the connection-destination device 30 determine the output destination of sound information. Note that the following processing may be performed by the information processing device 10. First, the connection-destination device 30 determines a candidate for the output destination of sound information (S101). For example, the connection-destination device 30 determines, as a candidate for the output destination of sound information, the terminal device 20 in a predetermined range with respect to the connection-destination device 30. Then, the connection-destination device 30 transmits, to the detected candidate, a request for conditional connection (S102). Next, when receiving the request for conditional connection from the connection-destination device 30, the terminal device 20 transmits a result to the request for conditional connection (S103). For example, on the basis of whether or not the terminal device 20 is connectable, the terminal device 20 transmits a result to the request for conditional connection. Next, when receiving the result to the request for conditional connection from the terminal device 20, the connection-destination device 30 transmits, to the terminal device 20, information requesting presentation of confirmation of connection (S104). Next, when receiving the information requesting presentation of confirmation of connection from the connection-destination device 30, the terminal device 20 presents confirmation of connection to the user (S105). Then, the terminal device 20 transmits, to the connection-destination device 30, a response of the user to the confirmation of connection (S106). Next, when receiving the response of the user, the connection-destination device 30 determines the output destination on the basis of the response of the user.

(2) Processing 2 in Terminal Device 20 and Connection-Destination Device 30

FIG. 10 is a flowchart illustrating a flow of processing in the terminal device 20 and the connection-destination device 30 according to the embodiment. Similar descriptions to those with FIG. 9 will be appropriately omitted below. Referring to FIG. 10, face authentication processing is performed, differently from FIG. 9. The processing from steps S201 to S203 is similar to the processing from steps S101 to S103. In step S204, the connection-destination device 30 transmits, to the terminal device 20, image-capture information captured by the connection-destination device 30. In step S205, when receiving the image-capture information from the connection-destination device 30, the terminal device 20 presents confirmation of connection, on the basis of a determination result of the image-capture information. The processing in steps S206 and S207 is similar to the processing in steps S106 and S107.

<2.4. Various Types of Processing>

The embodiment of the present disclosure has been described above. Next, various types of processing according to the embodiment of the present disclosure will be described. Note that the various types of processing to be described below may be singly applied to the embodiment of the present disclosure or may be, in combination, applied to the embodiment of the present disclosure. Furthermore, the various types of processing may be applied instead of the configuration described in the embodiment of the present disclosure or may be additionally applied to the configuration described in the embodiment of the present disclosure.

(1) Processing after Connection

In the above embodiment, after connection between the terminal device 20 and the connection-destination device 30, the information processing device 10 may perform processing of applying operation information for operating the connection-destination device 30 (e.g., user interface (UI) information) to operation information about the terminal device 20. Thus, with the operation information about the connection-destination device 30, the user can operate content to be output on the terminal device 20. Furthermore, the information processing device 10 may perform processing of outputting, on the terminal device 20, menu information regarding content that the connection-destination device 30 receives (e.g., a list of menus). For example, the information processing device 10 may perform processing of outputting menu information regarding purchase of merchandise having been introduced in a program and acquisition of information about the merchandise.

(2) Specification Based on Connection-Destination Control Device 40

In the above embodiment, given has been the case where the information processing device 10 specifies the user who has an interest in connection to the connection-destination device 30, on the basis of the angle information between a predetermined direction from the connection-destination device 30 to the connection-destination control device 40 and a predetermined direction from the connection-destination device 30 to the terminal device 20. Here, in a case where the connection-destination control device 40 operates the connection-destination device 30, on the assumption that the direction of the connection-destination control device 40 to the connection-destination device 30 is constant, the information processing device 10 may specify the user having the connection-destination control device 40 as the user who has an interest in connection to the connection-destination device 30. Furthermore, in a case where the connection-destination control device 40 operates the connection-destination device 30, on the assumption that user's hand operating the connection-destination control device 40 is constant in position or in length, the information processing device 10 may specify the user having the connection-destination control device 40 as the user who has an interest in connection to the connection-destination device 30.

(3) Storage 1 of User Information

In the above embodiment, given has been the case where the information processing device 10 performs determination of image-capture information with the user information stored in the storage unit 240 of the terminal device 20. Here, the information processing device 10 may store user information into the information processing device 10 and may perform determination of image-capture information with the user information stored in the information processing device 10. In this case, the information processing device 10 may include a storage unit 120. The information processing device 10 may acquire the user information by accessing the storage unit 120. Then, the information processing device 10 may perform determination of image-capture information, on the basis of comparison between the image-capture information transmitted from the connection-destination device 30 through the communication unit 100 and the user information stored in the storage unit 120. Note that, in this case, the information processing device 10 may perform determination of image-capture information by acquiring the identification information about the terminal device 20 transmitted from the terminal device 20 through the communication unit 100.

FIG. 11 illustrates an exemplary storage unit 120. The storage unit 120 illustrated in FIG. 11 stores user information. As illustrated in FIG. 11, the storage unit 120 may have items, such as "terminal device ID", "user ID", and "user information". The "terminal device ID" indicates identification information for identifying a terminal device 20. The "user ID" and the "user information" each store information similar to that in the storage unit 240, and thus the description thereof will be omitted.

(4) Storage 2 of User Information

The terminal device 20 may perform determination of image-capture information with the user information stored in the storage unit 240. For example, the control unit 210 may perform processing regarding determination of image-capture information. For example, the control unit 210 may acquire the image-capture information transmitted from the connection-destination device 30. For example, the control unit 210 may access the storage unit 240 to determine whether or not the image-capture information transmitted from the connection-destination device 30 includes the user information stored in the storage unit 240. The control unit 210 may transmit information regarding a determination result, for example, to the information processing device 10 through the communication unit 200.

(5) Response of User

A response of the user to confirmation of connection to the connection destination is not limited to the example in the above embodiment, and thus any response indicating a request from the user may be provided. For example, the response of the user according to the embodiment may be a response based on an operation (e.g., a click, a tap, an input, or a push on a button) to information displayed on the terminal device 20. Furthermore, for example, the response of the user according to the embodiment may be a response based on a gesture, such as a nod. Furthermore, for example, the response of the user according to the embodiment may be a response based on audio, such as an approval utterance (e.g., "Yes" or "Yeah").

(6) Switch to Speaker

In the above embodiment, given has been the case where the information processing device 10 controls, in a case where the degree of interest to the connection-destination device 30 of each user in a predetermined space fulfills a predetermined condition, a switch in connection to, for example, a speaker as output equipment capable of outputting sound information into the predetermined space. Here, in a case where a sound leakage outward from the predetermined space is a predetermined threshold or more, the information processing device 10 may make no switch in connection or control a re-switch in connection to the terminal device 20 of each user. Furthermore, on the basis of an attribute of each user (e.g., age or gender), for example, in a case where the optimum volume in sound is set to each user, the information processing device 10 may make no switch in connection or control a re-switch in connection to the terminal device 20 of each user. Furthermore, on the basis of an attribute of each user, for example, in a case where the difference between the age of the oldest user and the age of the youngest user is a predetermined threshold or more, the information processing device 10 may make no switch in connection or control a re-switch in connection to the terminal device 20 of each user.

(7) Types of Devices

In the above embodiment, the information processing device 10 may perform control, on the basis of the type of the device that each user wears. The information processing device 10 may perform control, for example, in accordance with a pair of earphones of an earhole open-air type or a pair of earphones of an earhole non-open-air type.

(8) Initial Registration

In the above embodiment, with connection-destination devices 30 previously registered as candidates connectable to the terminal device 20, the information processing device 10 may control a switch in connection. For example, the information processing device 10 may access the storage unit 240 to acquire information regarding the previously registered connection-destination devices 30. Then, in a case where the connection-destination device 30 to which a switch is to be made in connection is included in the previously registered connection-destination devices 30 as candidates, the information processing device 10 may control a switch in connection.

(9) Connection to Radio Type

In the above embodiment, in a case where the connection-destination device 30 serves as an information processing device of a broadcast (radio) type that broadcasts different sound information on each channel, such as radio, the information processing device 10 may control a switch in connection, on the basis of an operation through the terminal device 20. Specifically, on the basis of an operation through the terminal device 20, the information processing device 10 may perform processing of outputting the sound information on the channel selected by the user from the broadcasted sound information.

(10) Selection of Connection Destination by User

In the above embodiment, given has been the case where the information processing device 10 controls a switch in connection to the connection-destination device 30 corresponding to the connection destination to which the degree of interest is high. Here, in response to selection of the connection-destination device 30 by the user through the terminal device 20, the information processing device 10 may control a switch in connection to the selected connection-destination device 30. Note that, for example, the information processing device 10 may perform processing of presenting, on the display screen of the terminal device 20, operation information for a start on a switch in connection. Furthermore, for example, the information processing device 10 may perform processing of presenting the identification information about the connection-destination device 30 previously determined as the connection-destination device 30 corresponding to the terminal device 20.

(11) Personal Authentication

In the above embodiment, when controlling a switch in connection of the terminal device 20 to the connection-destination device 30, the information processing device 10 may transmit, to the terminal device 20, information for a request for personal authentication of the user. Then, on the basis of an authentication result of personal authentication of the user in the terminal device 20, in a case where the user is authenticated, the information processing device 10 may control a switch in connection of the terminal device 20 to the connection-destination device 30.

(12) Notification

In the above embodiment, due to a switch in connection of the terminal device 20 to the connection-destination device 30, the terminal device 20 is unlikely to receive notification to the terminal device 20. Here, the terminal device 20 may have an address for specification of the terminal device 20 on a communication network. Thus, the terminal device 20 can receive notification anytime, regardless of the connection destination in the connection relationship. Thus, for example, even while viewing and listening to a television (exemplary connection-destination device 30), the user can receive notification through a smartphone (exemplary terminal device 20).

(13) Modifications of Terminal Device 20

The terminal device 20 according to the embodiment may have the function of the connection-destination control device 40. Specifically, the terminal device 20 may be a remote controller that controls the connection-destination device 30. Note that the terminal device 20 may be achieved by any equipment having the function of the connection-destination control device 40. Furthermore, the terminal device 20 may be a smartphone enabling an application to achieve the function of the connection-destination control device 40. Note that the terminal device 20 may be achieved by any equipment enabling an application to achieve the function of the connection-destination control device 40.

Figure 12A:
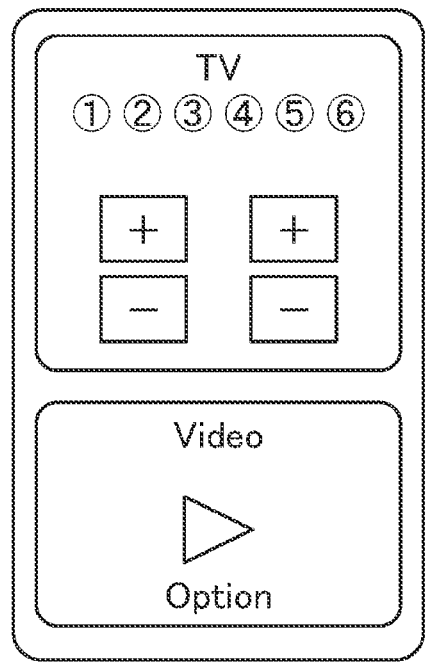
FIGS. 12A and 12B illustrate exemplary modifications of a terminal device according to the embodiment.
Figure 12B:
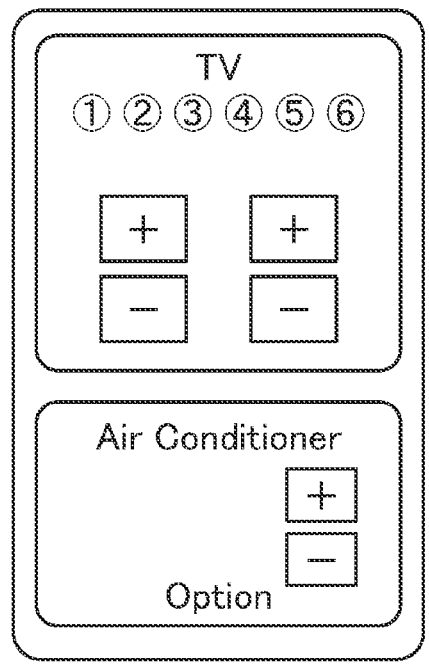

FIGS. 12A and 12B illustrate exemplary modifications of the terminal device 20. Specifically, illustrated are remote controllers as the terminal device 20. FIG. 12A illustrates the terminal device 20 in a case where a television and a video are located in a predetermined range. As illustrated in FIG. 12A, the terminal device 20 includes operation information about channels (channels 1 to 6), "+", and "−", corresponding to the television. Furthermore, the terminal device 20 includes operation information corresponding to a start on the video. Meanwhile, FIG. 12B illustrates the terminal device 20 in a case where a television and an air conditioner are located in a predetermined range. Referring to FIG. 12B, included is operation information about "+" and "−", corresponding to the air conditioner, differently from FIG. 12A.

In a case where a predetermined range in which the connection-destination device 30 is to be controlled is set, for example, indoors, all indoor home electronics are likely to be controlled. In response to definite orientation of the terminal device 20 to a specific connection-destination device 30 by the user, the information processing system 1 may display, on the screen of the terminal device 20, such operation information as in FIGS. 12A and 12B. For example, the information processing system 1 may display, in response to orientation of the terminal device 20 to a television by the user, a remote controller for the television, display, in response to orientation of the terminal device 20 to an air conditioner by the user, a remote controller for the air conditioner, and display, in response to orientation of the terminal device 20 to an electric light by the user, a remote controller for the electric light. Furthermore, in a case where the user desires to operate a plurality of connection-destination devices 30, the information processing system 1 may control the terminal device 20 such that each connection-destination device 30 is displayed on the screen of the terminal device 20 by switching in tab. Furthermore, in a case where AR is used in display on the terminal device 20, the information processing system 1 may appropriately control the terminal device 20 such that the display screen of the remote controller is disabled from being kept displayed.

<<3. Exemplary Hardware Configuration>>

Figure 13:
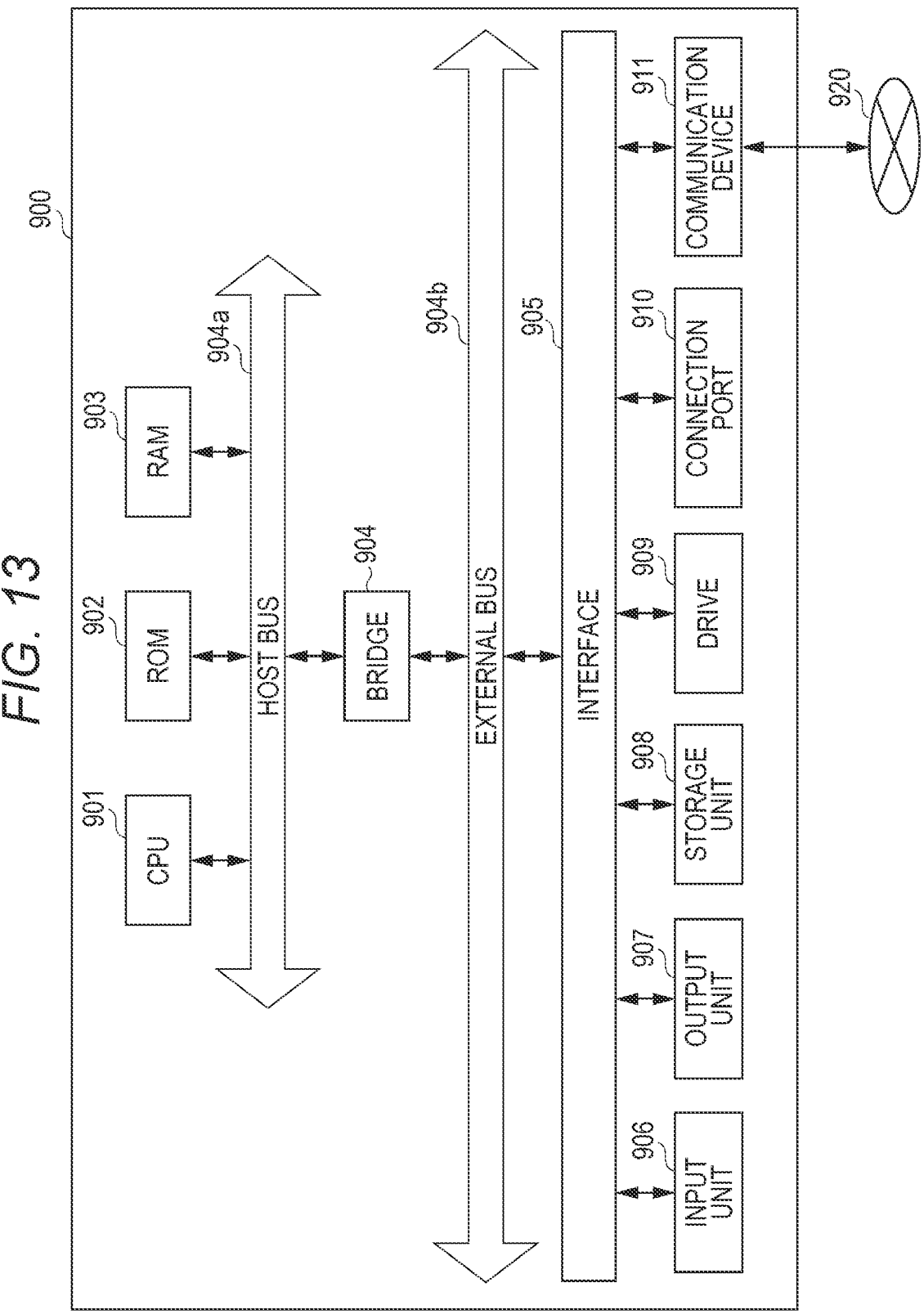
FIG. 13 illustrates the hardware configuration of an exemplary computer that achieves the function of an information processing device.

Finally, an exemplary hardware configuration of an information processing device according to the embodiment will be described with reference to FIG. 13. FIG. 13 is a block diagram of an exemplary hardware configuration of the information processing device according to the embodiment. Note that the information processing device 900 illustrated in FIG. 13 can achieve, for example, the information processing device 10, the terminal device 20, or the connection-destination device 30 illustrated in FIG. 7. Information processing by the information processing device 10, the terminal device 20, and the connection-destination device 30 according to the embodiment is achieved by hardware to be described below and software in cooperation.

As illustrated in FIG. 13, the information processing device 900 includes a central processing unit (CPU) 901, a read only memory (ROM) 902, and a random access memory (RAM) 903. Furthermore, the information processing device 900 includes a host bus 904a, a bridge 904, an external bus 904b, an interface 905, an input device 906, an output device 907, a storage device 908, a drive 909, a connection port 910, and a communication device 911. Note that the hardware configuration herein is exemplary and part of the constituent elements may be omitted. Furthermore, the hardware configuration may further include other constituent elements in addition to the constituent elements herein.

For example, the CPU 901 functions as an arithmetic processing unit or a control device, and controls the entire operation of each constituent element or part thereof, on the basis of various types of programs recorded on the ROM 902, the RAM 903, or the storage device 908. The ROM 902 corresponds to a means of storing, for example, a program to be read by the CPU 901 or data for use in computing. The RAM 903 stores, for example, a program to be read by the CPU 901, various types of parameters that appropriately change at the time of execution of the program, and the like temporarily or permanently. These constituent elements are mutually connected through the host bus 904a, such as a CPU bus. For example, in cooperation with software, the CPU 901, the ROM 902, and the RAM 903 can achieve the function of the control unit 110, the function of the control unit 210, or the function of the control unit 310 described with reference to FIG. 7.

For example, the CPU 901, the ROM 902, and the RAM 903 are mutually connected through the host bus 904a enabling high-speed data transmission. Meanwhile, for example, the host bus 904a is connected, through the bridge 904, to the external bus 904b relatively slow in data transmission rate. Furthermore, the external bus 904b is connected to various constituent elements through the interface 905.

For example, the input device 906 is achieved by a device to which a listener inputs information, such as a mouse, a keyboard, a touch panel, a button, a microphone, a switch, or a lever. Furthermore, for example, the input device 906 may be a remote control device with infrared light or other radio waves, or may be external connection equipment, such as a mobile phone or a PDA, corresponding in operation to the information processing device 900. Moreover, for example, the input device 906 may include an input control circuit or the like that generates an input signal on the basis of information input with the above input means and outputs the input signal to the CPU 901. The administrator of the information processing device 900 can input various types of data or give an instruction for processing operation to the information processing device 900 by operating the input device 906.

In addition, the input device 906 can include a device that detects the position of the user. For example, the input device 906 can include various types of sensors, such as an image sensor (e.g., a camera), a depth sensor (e.g., a stereo camera), an acceleration sensor, a gyro sensor, a geomagnetic sensor, an optical sensor, a sound sensor, a range sensor (e.g., a time of flight (ToF) sensor), and a force sensor. Furthermore, the input device 906 may acquire information regarding the state of the information processing device 900 itself, such as the attitude or movement speed of the information processing device 900, or information regarding the ambient space of the information processing device 900, such as the ambient brightness or noise of the information processing device 900. Furthermore, the input device 906 may include a global navigation satellite system (GNSS) module that receives GNSS signals from GNSS satellites (e.g., global positioning system (GPS) signals from GPS satellites) and measures positional information including the latitude, longitude, and altitude of the device. Furthermore, for positional information, for example, the input device 906 may detect the position through Wi-Fi (registered trademark), transmission and reception with a mobile phone, a PHS, a smartphone, or the like, or near field communication. For example, the input device 906 can achieve the function of the sensor unit 230 described with reference to FIG. 7.

The output device 907 includes a device capable of notifying the user of acquired information, visually or aurally. Examples of such a device include a display device, such as a CRT display device, a liquid crystal display device, a plasma display device, an EL display device, a laser projector, an LED projector, or a lamp, an acoustic output device, such as a speaker or a pair of headphones, and a printer device, or the like. For example, the output device 907 outputs results acquired from various types of processing performed by the information processing device 900. Specifically, the display device visually displays results acquired from various types of processing performed by the information processing device 900 in various formats, such as text, an image, a table, and a graph. On the other hand, the audio output device converts an audio signal including, for example, reproduced audio data or acoustic data, into an analog signal, and outputs the analog signal aurally. For example, the output device 907 can achieve the function of the output unit 220 or the function of the output unit 320 described with reference to FIG. 7.

The storage device 908 serves as a device for data storage provided as an exemplary storage unit of the information processing device 900. For example, the storage device 908 is achieved by a magnetic storage-unit device, such as an HDD, a semiconductor storage device, an optical storage device or a magneto-optical storage device, and the like. The storage device 908 may include, for example, a storage medium, a recording device that records data on the storage medium, a reading device that reads the data from the storage medium, and a deleting device that deletes the data recorded on the storage medium. The storage device 908 stores, for example, a program and various types of data to be executed by the CPU 901 and various types of data acquired from outside. For example, the storage device 908 can achieve the function of the storage unit 240 described with reference to FIG. 7.

The drive 909 serving as a reader-writer for storage media is built in the information processing device 900 or is attached to the information processing device 900 externally. The drive 909 reads information recorded on a removable storage medium, such as a magnetic disk, an optical disc, a magneto-optical disc, or a semiconductor memory, loaded therein, and outputs the information to the RAM 903. Furthermore, the drive 909 can write information on the removable storage medium.

For example, the connection port 910 serves as a port for connection of external connection equipment, such as a universal serial bus (USB) port, an IEEE 1394 port, a small computer system interface (SCSI), an RS-232C port, or an optical audio terminal.

For example, the communication device 911 serves as a communication interface including a communication device or the like for connection to a network 920. The communication device 911 is, for example, a communication card for a wired or wireless local area network (LAN), long term evolution (LTE), Bluetooth (registered trademark), wireless USB (WUSB), or the like. Furthermore, the communication device 911 may be, for example, a router for optical communication, a router for asymmetric digital subscriber line (ADSL), or a modem for any type of communication. For example, the communication device 911 can transmit or receive a signal or the like to or from the Internet or other communication equipment, in accordance with a predetermined protocol, for example, such as TCP/IP. For example, the communication device 911 can achieve the function of the communication unit 100, the function of the communication unit 200, or the function of the communication unit 300 described with reference to FIG. 7.

Note that the network 920 includes a wired or wireless transmission line for information to be transmitted from a device connected to the network 920. For example, the network 920 may include public line networks, such as the Internet, a telephone line network, and a satellite communication network, various types of local area networks (LANs) and wide area networks (WANs) inclusive of Ethernet (registered trademark), and the like. Furthermore, the network 920 may include a dedicated line network, such as an internet protocol-virtual private network (IP-VPN).

Above given has been the exemplary hardware configuration enabling achievement of the function of the information processing device 900 according to the embodiment. Each of the constituent elements above may be achieved with a general-purpose member or may be achieved by hardware specializing in the function of each of the constituent element. Therefore, depending on the technological level at the time of embodiment, the hardware configuration to be used can be appropriately changed.

<<4. Summary>>

As described above, on the basis of a response of the user to confirmation of connection to the connection destination presented on the basis of the degree of interest to the connection destination of the user having the terminal device 20, the information processing device 10 according to the embodiment controls a switch in connection to the connection destination. Thus, for the connection destination of the terminal device 20 of the user, the information processing device 10 enables automatic selection and connection. Furthermore, for the connection destination of the terminal device 20 of the user, the information processing device 10 enables selection and connection with no GUI.

Therefore, provided can be an information processing device, an information processing method, and an information processing program, which are novel and improved, enabling acceleration of further improvement in usability.

The preferred embodiment of the present disclosure has been described in detail above with reference to the accompanying drawings, but the technical scope of the present disclosure is not limited to the examples. It is obvious that a person skilled in the technical field of the present disclosure can conceive various types of alterations or modifications in the scope of the technical idea described in the claims, and thus it is understood that such alterations or modifications rightfully belong to the technical scope of the present disclosure.

For example, each device described in the present specification may be achieved as an independent device, or part of the devices or each of the devices may be achieved as a separate device. For example, the information processing device 10, the terminal device 20, and the connection-destination device 30 illustrated in FIG. 7 may be each achieved as an independent device. Furthermore, for example, achieved may be a server device connected to the information processing device 10, the terminal device 20, and the connection-destination device 30, for example, through a network or the like. Furthermore, a server device connected, for example, through a network or the like may have the function of the control unit 110 included in the information processing device 10.

Furthermore, a series of processing by each device described in the present specification may be achieved with any of software, hardware, and a combination of software and hardware. A program included in software is previously stored, for example, in a recording medium (non-transitory media) provided inside or outside each device. Then, for example, each program is read into a RAM at the time of execution by a computer and then is executed by a processor, such as a CPU.

Furthermore, the processing described with the flowcharts in the present specification is not necessarily performed in the illustrated order. Some processing steps may be performed in parallel. Furthermore, an additional processing step may be adopted, and part of the processing steps may be omitted.

Furthermore, the effects described in the present specification are just explanatory or exemplary, and thus are not limiting. That is, the technology according to the present disclosure has other effects obvious to a person skilled in the art from the descriptions in the present specification, in addition to the effects above or instead of the effects above.

Note that the following configurations belong to the technical scope of the present disclosure.

(1)

An information processing device including:

a calculation unit configured to calculate a degree of interest to a connection destination of a user having a terminal device; and a connection switch unit configured to control a switch in connection to the connection destination, on the basis of a response of the user to confirmation of connection to the connection destination, the confirmation of connection being presented on the basis of the degree of interest calculated by the calculation unit.

(2)

The information processing device according to the (1), in which the calculation unit calculates the degree of interest, on the basis of positional information between the terminal device and the connection destination.

(3)

The information processing device according to the (2), in which the calculation unit calculates the degree of interest, on the basis of the positional information based on arrival time of a radio wave.

(4)

The information processing device according to any one of the (1) to (3), in which the calculation unit calculates the degree of interest, on the basis of angle information between a direction of line-of-sight of the user and a direction in which a front of the connection destination faces.

(5)

The information processing device according to any one of the (1) to (4), in which the calculation unit calculates respective degrees of interest to a plurality of connection destinations, and the connection switch unit controls a switch in connection to a connection destination to which the degree of interest is highest.

(6)

The information processing device according to any one of the (1) to (5), in which the calculation unit calculates respective degrees of interest to the connection destination of users at a plurality of the terminal devices in a predetermined range with respect to the connection destination, and the connection switch unit controls a switch in connection of the terminal device of a user, of which the degree of interest fulfills a predetermined condition, to the connection destination.

(7)

The information processing device according to the (6), in which the connection switch unit controls, in a case where the degree of interest to the connection destination of each of the users in a predetermined space fulfills the predetermined condition, a switch in connection to output equipment that outputs sound information into the predetermined space.

(8)

The information processing device according to any one of the (1) to (7), in which the connection switch unit controls a switch in connection such that sound information is acquirable from the connection destination.

(9)

The information processing device according to any one of the (1) to (8), in which the connection switch unit controls a switch in connection from a connection destination that distributes first content to a connection destination that distributes second content different from the first content.

(10)

The information processing device according to the (9), in which the connection switch unit performs control, on the basis of a response of the user to confirmation of connection for a switch in connection to the connection destination that distributes the second content.

(11)

The information processing device according to any one of the (1) to (10), in which the connection switch unit controls a switch in connection to the connection destination, on the basis of a gesture of the user to confirmation of connection to the connection destination as a response of the user.

(12)

The information processing device according to any one of the (1) to (11), further including a notification determination unit configured to determine a notification destination to be notified of the confirmation of connection, on the basis of image-capture information captured by the connection destination and user information about the user stored in the terminal device.

(13)

The information processing device according to any one of the (1) to (12), in which the connection switch unit controls a switch in the connection through Bluetooth (registered trademark) or Wifi.

(14)

The information processing device according to any one of the (1) to (13), in which the calculation unit calculates the degree of interest at the terminal device capable of outputting sound information.

(15)

The information processing device according to the (14), in which the calculation unit calculates the degree of interest at the terminal device serving as a pair of headphones.

(16)

The information processing device according to any one of the (1) to (14), in which the calculation unit calculates the degree of interest to the connection destination capable of outputting image information.

(17)

An information processing method to be performed by a computer, the method including:

calculating a degree of interest to a connection destination of a user having a terminal device; and controlling a switch in connection to the connection destination, on the basis of a response of the user to confirmation of connection to the connection destination, the confirmation of connection being presented on the basis of the calculated degree of interest.

(18)

An information processing program for causing a computer to perform:

a calculation process of calculating a degree of interest to a connection destination of a user having a terminal device; and a connection switch process of controlling a switch in connection to the connection destination, on the basis of a response of the user to confirmation of connection to the connection destination, the confirmation of connection being presented on the basis of the degree of interest calculated by the calculation process.

REFERENCE SIGNS LIST

1 Information processing system
10 Information processing device
20 Terminal device
30 Connection-destination device
100 Communication unit
110 Control unit
111 Acquisition unit
112 Processing unit
1121 Determination unit
1122 Calculation unit
1123 Switch control unit
1124 Notification determination unit
113 Provision unit
200 Communication unit
210 Control unit
220 Output unit
230 Sensor unit
240 Storage unit 300 Communication unit
310 Control unit
320 Output unit
330 Image capturing unit

The invention claimed is:

1. An information processing device, comprising:
a calculation unit configured to calculate a degree of interest of a user to a first connection destination;
a provision unit configured to control, based on the degree of interest, a terminal device of the user to present first information,
wherein the first information is for confirmation of a connection of the terminal device with the first connection destination;
a communication unit configured to receive, based on the presentation of the first information, second information indicating a response of the user to the confirmation of the connection of the terminal device with the first connection destination; and
a connection switch unit configured to control, based on the response of the user, the connection of the terminal device with the first connection destination.

2. The information processing device according to claim 1, wherein the calculation unit is further configured to calculate the degree of interest based on positional information associated with each of the terminal device and the first connection destination.

3. The information processing device according to claim 2, wherein the positional information is based on an arrival time of a radio wave at the terminal device.

4. The information processing device according to claim 1, wherein the calculation unit is further configured to calculate the degree of interest based on an angle between a direction of line-of-sight of the user and a direction in which a front of the first connection destination faces.

5. The information processing device according to claim 1, wherein
the calculation unit is further configured to calculate a plurality of degrees of interest of the user,
each degree of interest of the plurality of degrees of interest is for a respective connection destination of a plurality of connection destinations that includes the first connection destination, and
the connection switch unit is further configured to control the connection of the terminal device with the first connection destination to which the degree of interest is highest among the plurality of connection destinations.

6. The information processing device according to claim 1, wherein
the calculation unit is further configured to calculate respective degrees of interest of a plurality of users to the first connection destination,
the plurality of users includes the user,
each user of the plurality of users is associated with a corresponding terminal device of a plurality of terminal devices that includes the terminal device,
the plurality of terminal devices is in a specific range with respect to the first connection destination, and
the connection switch unit is further configured to control the connection of the terminal device of the user, of which the degree of interest fulfills a specific condition, to the first connection destination.

7. The information processing device according to claim 6, wherein the connection switch unit is further configured to control, in a case where the respective degrees of interest of the plurality of users in a specific space fulfill the specific condition, output equipment to output sound information into the specific space.

8. The information processing device according to claim 1, wherein the connection switch unit is further configured to control, based on the response of the user, the terminal device to acquire sound information from the first connection destination.

9. The information processing device according to claim 1, wherein the connection switch unit is further configured to control a switch of the connection of the terminal device from the first connection destination that distributes first content to a second connection destination that distributes second content different from the first content.

10. The information processing device according to claim 9, wherein the connection switch unit is further configured to control, based on the response of the user, the switch of the connection of the terminal device to the second connection destination that distributes the second content.

11. The information processing device according to claim 1, wherein the connection switch unit is further configured to control the connection of the terminal device with the first connection destination, based on a gesture of the user as the response of the user.

12. The information processing device according to claim 1, further comprising a notification determination unit configured to determine a notification destination, based on
image-capture information captured by the first connection destination, and
user information about the user stored in the terminal device,
wherein the communication unit is further configured to notify the notification destination of the first information.

13. The information processing device according to claim 1, wherein the connection of the terminal device with the first connection destination is through one of Bluetooth (registered trademark) or Wifi.

14. The information processing device according to claim 1, wherein the provision unit is further configured to control the terminal device to output sound information as the first information.

15. The information processing device according to claim 14, wherein the terminal device is a pair of headphones.

16. The information processing device according to claim 1, wherein the calculation unit is further configured to calculate the degree of interest to the first connection destination that outputs image information.

17. An information processing method, comprising:
calculating, by a processor, a degree of interest of a user to a connection destination;
controlling, by the processor, based on the degree of interest, a terminal device of the user to present first information,
wherein the first information is for confirmation of a connection of the terminal device with the connection destination;
receiving, by the processor, based on the presentation of the first information, second information indicating a response of the user to the confirmation of the connection of the terminal device with the connection destination; and
controlling, by the processor, based on the response of the user, the connection of the terminal device with the connection destination.

18. A non-transitory computer-readable medium having stored thereon, computer-executable instructions which, when executed by a processor, cause the processor to execute operations, the operations comprising:
- calculating a degree of interest of a user to a connection destination;
- controlling, based on the degree of interest, a terminal device of the user to present first information,
  - wherein the first information is for confirmation of a connection of the terminal device with the connection destination;
- receiving, based on the presentation of the first information, second information indicating a response of the user to the confirmation of the connection of the terminal device with the connection destination; and
- controlling, based on the response of the user, the connection of the terminal device with the connection destination.

* * * * *